(12) United States Patent
Shingaki

(10) Patent No.: US 6,319,115 B1
(45) Date of Patent: Nov. 20, 2001

(54) AIR CYCLE HOUSES AND HOUSE VENTILATION SYSTEM

(75) Inventor: Morinobu Shingaki, Okinawa (JP)

(73) Assignee: Shinyo Co., Ltd., Okinoawa (JP)

( * ) Notice: Subject to any disclaimer, the term of this patent is extended or adjusted under 35 U.S.C. 154(b) by 0 days.

(21) Appl. No.: 09/685,645

(22) Filed: Oct. 5, 2000

(30) Foreign Application Priority Data

Nov. 18, 1999 (JP) .................................................. 11-327875
Jan. 26, 2000 (JP) .................................................. 12-017195

(51) Int. Cl.[7] ................................................... F24F 7/007
(52) U.S. Cl. ........................ 454/186; 165/210; 165/909; 454/239; 454/253
(58) Field of Search ..................................... 454/185, 186, 454/239, 251, 252, 253; 165/210, 909

(56) References Cited

FOREIGN PATENT DOCUMENTS

602489-A * 3/1926 (FR) ...................................... 454/186
62-294833-A * 12/1987 (JP) ...................................... 454/186

* cited by examiner

*Primary Examiner*—Harold Joyce
(74) *Attorney, Agent, or Firm*—Arent Fox Kintner Plotkin & Kahn, PLLC

(57) ABSTRACT

An indoor space is externally enclosed and thermally insulated by an underfloor insulating layer, a wall insulating layer and a ceiling insulating layer. An underfloor ventilation layer is defined between a floor and the underfloor insulating layer, and a ceiling ventilation layer is formed between a ceiling and the ceiling insulating layer. Communication is established through the underfloor ventilation layer, the indoor space and the ceiling ventilation layer, via floor vents and ceiling vents. Outdoor air is drawn into the indoor space from an air intake. Air is expelled from the ceiling ventilation layer into an underroof space by ventilation fans and then discharged outdoors from underroof outlets. A heat exchange ventilator is disposed in the ceiling ventilation layer, whereby heat exchange takes place between air in the ceiling ventilation layer and incoming fresh outdoor air. After the heat exchange, the incoming air is delivered into the underfloor ventilation layer.

8 Claims, 7 Drawing Sheets

AIR CYCLE HOUSES AND HOUSE VENTILATION SYSTEM

BACKGROUND OF THE INVENTION

The present invention relates to air cycle houses with a highly airtight and heat-insulating structure which applies either the natural ventilation system dependent on natural convection or the heat-exchange ventilation system using a heat exchanger, as selected according to the weather, and a house ventilation system for such houses.

As an energy-saving measure for so-called new-generation houses intended to provide a more comfortable indoor environment and reduce energy consumption, there are demands for improving air-tightness and heat-insulating property of a house and also achieving planned ventilation through a definite air entrance and exit.

Known ventilation methods for a house with a highly airtight and heat-insulating structure include the natural ventilation system and the heat-exchange ventilation system. The former allows fresh air to enter the house, to circulate therein and to exit out of the house by natural air convection. The latter intends to minimize the indoor heat loss by performing ventilation together with forced heat exchange between the incoming outdoor air and the outgoing indoor air.

The inventor of the present invention has diligently investigated the use of the natural ventilation system, as recently disclosed in Japanese Patent Application Laid-open No. 2000-144957. This technology proposes an air cycle house 8 for practical use, as shown in FIG. 7 of the present application. The air cycle house 8 comprises an exterior wall 81, an interior wall 82 and a wall ventilation layer 83 defined in-between. The wall ventilation layer 83 establishes communication between outdoor air and an underroof space (attic) 84 for ventilation of the inner side of the exterior wall 81. Besides, the entire indoor space enjoys an enhanced heat insulation property from the outdoor air by disposing a wall insulating layer 87 between the interior wall 82 and the wall ventilation layer 83, an underfloor insulating layer 88 below a downstairs floor panel 85 and a ceiling insulating layer 89 above an upstairs ceiling 86. Further, an intermediate ventilation layer 90 allows communication between the downstairs indoor space and the upstairs indoor space. There is also provided an air intake 91 for introducing outdoor air into the downstairs indoor space. In this structure, the introduced air flows out from the downstairs indoor space through a downstairs ceiling 92, passes the intermediate ventilation layer 90 and the upstairs indoor space and reaches the underroof space 84. Thus, warm indoor air naturally rises from the downstairs towards the underroof space 84. In summer, rise of the indoor temperature is suppressed by actively releasing hot air in the underroof space 84 out of the house by a ventilation fan 93. In winter, indoor heat loss is prevented by returning warm air in the underroof space 84 to the downstairs indoor space by a reflux fan 94.

A house relying on the heat-exchange ventilation system is disclosed, for example, in Japanese Patent Application Laid-open Nos. H10-30283 (1998-30283) and H10-245903 (1998-245903). The house comprises a ventilation layer provided around the indoor space and a heat-insulating layer surrounding the ventilation layer externally, wherein a heat exchange ventilator disposed in the ventilation layer enforces heat exchange between outdoor air to be supplied into the house and indoor air to be discharged therefrom.

As far as these conventional technologies are concerned, the natural ventilation system is capable of ensuring a sufficient amount of ventilation rather easily. However, when the inside of the house is air-conditioned, a greater amount of heat is lost in proportion to the ventilation amount. Thus, in regions of intense summer heat or severe winter cold, it is difficult to carry out satisfactory ventilation on a constant basis. An attempt to secure a sufficient amount of ventilation inevitably results in increase of energy load for air conditioning.

On the other hand, the heat-exchange ventilation system is capable of decreasing heat loss inside an air-conditioned house owing to heat exchange between the outdoor air to be taken in (incoming air) and the indoor air to be vented out (outgoing air) However, it cannot provide a sufficient amount of ventilation without a considerably large ventilator. Lack of ventilation not only causes pollution of indoor air and deterioration of interior comfort, but also sacrifices the durability of the house due to incidence of dew condensation, growth of mold and ticks, etc.

In order to improve the interior comfort and the durability of a house, it is desirable to ventilate the house as constantly as possible, throughout a day and a year. From a security point of view, however, it is not recommended to leave windows, etc. open during daily or long-term absence. In terms of energy cost, continuous operation of a ventilator costs too much. In addition, some people, particularly aged persons, find it annoying to conduct appropriate ventilation (e.g. to open and close windows, to change over the ventilator operation) in accordance with the season or the weather.

SUMMARY OF THE INVENTION

In view of such circumstances, the present invention intends to provide a novel air cycle house which comprises air circulation routes which can be properly selected for either the natural ventilation or the heat-exchange ventilation according to weather conditions, the structure of the air circulation routes being not only rational and efficient but also economical.

Another object of the present invention is to provide a house ventilation system which effects an automatic change-over of the ventilation systems, so as to reduce the resident's burden and the annual energy cost.

In order to achieve the above objects, this invention discloses an air cycle house which comprises: an indoor space enclosed by a floor, an interior wall and a ceiling; an underfloor insulating layer, a wall insulating layer and a ceiling insulating layer laid externally of the floor, the interior wall and the ceiling, respectively; an exterior wall disposed externally of the wall insulating layer; an underroof space locating above the ceiling insulating layer; an underfloor ventilation layer defined between the floor and the underfloor insulating layer; a ceiling ventilation layer defined between the ceiling and the ceiling insulating layer; an air intake which can be opened and shut and which is formed through the exterior wall, the wall insulating layer and the interior wall to provide communication with the indoor space and the underfloor ventilation layer; at least one floor vent which opens through the floor to provide communication between the underfloor ventilation layer and the indoor space; at least one ceiling vent which opens through the ceiling to provide communication between the indoor space and the ceiling ventilation layer; at least one shuttered ventilation fan projecting through the ceiling insulating layer to discharge air in the ceiling ventilation layer up to the underroof space; at least one underroof outlet for discharging air in the underroof space out of the house; a heat exchange ventilator installed in the ceiling ventilation layer and communicable with outdoor air, which ventilator discharges air in the ceiling ventilation layer out of the house and takes in outdoor air, with allowing heat exchange between incoming air and outgoing air; and a vertical duct equipped with an air distribution fan, joined to an intake part of the heat exchange ventilator and extending vertically through the indoor space, thereby to deliver the incoming air to the underfloor ventilation layer after the heat exchange.

This constitution is applicable to a one-story house, or any one story in a multi-story house which is completely sectioned off from the upper and lower stories with no interfloor air communication. Defined by the floor, the interior wall and the ceiling, the indoor space is externally enclosed by insulating layers which are composed of the underfloor insulating layer, the wall insulating layer and the ceiling insulating layer, and thereby thermally insulated from outdoor air. The underfloor ventilation layer is defined between the floor and the underfloor insulating layer, and the ceiling ventilation layer is formed between the ceiling and the ceiling insulating layer. The underfloor ventilation layer, the indoor space and the ceiling ventilation layer are communicated with each other via the floor vent and the ceiling vent. The air intake is provided as a route for supplying outdoor air into the indoor space, while the ventilation fan, the underroof space and the underroof outlet constitute a route for discharging the air in the ceiling ventilation layer out of the house. Further, by the heat exchange ventilator disposed in the ceiling ventilation layer, the air therein is subjected to heat exchange with fresh outdoor air before vented outdoors, and the introduced outdoor air which enters through the heat exchange ventilator is then supplied into the underfloor ventilation layer.

This invention is featured by the air circulation routes which combine the ventilation routes of the natural ventilation system and those of the heat-exchange ventilation system. The ventilation routes of these two systems can be selectively employed depending on weather conditions.

Specifically, when the climate does not require indoor air-conditioning, e.g. in spring or autumn, the air intake is opened to allow entry of outdoor air. At the same time, the ventilation fan is driven to guide the incoming outdoor air from the indoor space upwardly to the ceiling ventilation layer, and the air is eventually discharged outdoors from the underroof space. During this process, the heat exchange ventilator and the air distribution fan of the vertical duct connected therewith are stopped. Thus, by means of natural convection from the lower part to the upper part of the house, the natural ventilation system can provide a sufficient amount of ventilation and can effectively protect the inside of the house from generation of mold, ticks, dew condensation, etc. Besides, the natural ventilation system is cost-efficient in terms of energy, because it only needs an energy for driving the ventilation fan.

On the other hand, when the climate requires indoor air-conditioning, e.g. in summer or winter, the air intake is shut and the ventilation fan is turned off to thermally insulate the indoor space from the outdoor air. Meanwhile, the heat exchange ventilator and the air distribution fan of the vertical duct connected to the ventilator are activated. Thereby, air in the ceiling ventilation layer is discharged with exchanging heat with outdoor air, and fresh air is drawn in through the heat exchange ventilator and delivered down into the underfloor ventilation layer. In this manner, a certain amount of ventilation is realized with a minimum loss of thermal energy from the air in the air-conditioned indoor space.

The above-mentioned ventilation systems share the floor vent and the ceiling vent as the air circulation routes. In other words, unlike a conventional ventilation structure of incorporating two independent ventilation routes in a house, the present invention applies an integral ventilation structure of sharing a part of the two types of ventilation routes and selectively changing from one system to the other. The resulting system is rational and economical in terms of structure and facilities.

Another air cycle house of the present invention comprises: a downstairs indoor space enclosed by a downstairs floor, a downstairs interior wall and a downstairs ceiling; an upstairs indoor space enclosed by an upstairs floor, an upstairs interior wall and an upstairs ceiling; an underfloor insulating layer, a wall insulating layer and a ceiling insulating layer laid externally of the downstairs floor, the upstairs and downstairs interior walls and the upstairs ceiling, respectively; an exterior wall disposed externally of the wall insulating layer; an underroof space locating above the ceiling insulating layer; an underfloor ventilation layer defined between the downstairs floor and the underfloor insulating layer; an intermediate ventilation layer defined between the downstairs ceiling and the upstairs floor; a ceiling ventilation layer defined between the upstairs ceiling and the ceiling insulating layer; an air intake which can be opened and shut and which is formed through the downstairs exterior wall, the wall insulating layer and the downstairs interior wall to provide communication with the downstairs indoor space and the underfloor ventilation layer; at least one downstairs floor vent which opens through the downstairs floor to provide communication between the underfloor ventilation layer and the downstairs indoor space; at least one downstairs ceiling vent which opens through the downstairs ceiling to provide communication between the downstairs indoor space and the intermediate ventilation layer; at least one upstairs floor vent which opens through the upstairs floor to provide communication between the intermediate ventilation layer and the upstairs indoor space; at least one upstairs ceiling vent which opens through the upstairs ceiling to provide communication between the upstairs indoor space and the ceiling ventilation layer; at least one shuttered ventilation fan projecting through the ceiling insulating layer to discharge air in the ceiling ventilation layer up to the underroof space; at least one underroof outlet for discharging air in the underroof space out of the house; a downstairs vertical duct equipped with an air distribution fan and extending vertically through the downstairs indoor space, thereby to deliver air in the underfloor ventilation layer toward the intermediate ventilation layer; an upstairs vertical duct equipped with an air distribution fan and extending vertically through the upstairs indoor space, thereby to deliver air in the ceiling ventilation layer toward the intermediate ventilation layer; and a heat exchange ventilator installed in the intermediate ventilation layer and joined to the downstairs vertical duct and the upstairs vertical duct, which ventilator discharges, out of the house, air drawn from the underfloor ventilation layer via the downstairs vertical duct as well as air drawn from the ceiling ventilation layer via the upstairs vertical duct, and which also takes in outdoor air, with allowing heat exchange between incoming air and outgoing air and delivering the incoming air to the intermediate ventilation layer after the heat exchange.

This constitution is applicable to a two-story or multistory house, in which air is communicable between upstairs and downstairs. The upstairs indoor space, the downstairs indoor space and the intermediate ventilation layer formed therebetween are enclosed and thermally insulated by heat-insulating layers composed of the underfloor insulating layer, the wall insulating layer and the ceiling insulating layer. The underfloor ventilation layer is formed under the floor of the downstairs indoor space, and the ceiling ventilation layer is provided above the upstairs ceiling. Mutual communication is established through the underfloor ventilation layer, the downstairs indoor space, the intermediate ventilation layer, the upstairs indoor space and the ceiling ventilation layer, via the floor vent and the ceiling vent in each story. The air intake is provided as a route for supplying outdoor air into the indoor space, while the ventilation fan, the underroof space and the underroof outlet serve as a route for discharging the air in the ceiling ventilation layer out of the house. With the heat exchange ventilator located in the intermediate ventilation layer, the air is led from the ceiling ventilation layer and the underfloor ventilation layer through the upstairs and downstairs vertical ducts, and eventually vented out under heat exchange with outdoor air. In the meantime; fresh air entering through the heat exchange ventilator is guided into the intermediate ventilation layer and then supplied to the upstairs and downstairs indoor spaces.

Similar to the former construction, this invention is arranged to combine the ventilation routes of the natural ventilation system and the heat-exchange ventilation system, and to selectively change to either of the two ventilation systems in consideration of weather conditions.

Specifically, when the climate does not necessitate indoor air-conditioning, the air intake is opened to allow entry of outdoor air. At the same time, the ventilation fan is driven to guide the incoming outdoor air from the downstairs indoor space upwardly to the ceiling ventilation layer and to discharge the air in the underroof space out of the house. During this process, the heat exchange ventilator and the air distribution fan of each vertical duct connected therewith are stopped. Thus, by means of natural convection from the lower part to the upper part of the house, the natural ventilation system can provide a sufficient amount of ventilation throughout the house and can effectively prevent generation of mold, ticks, dew condensation, etc. Besides, the natural ventilation system is cost-efficient, because it only needs an energy for driving the ventilation fan.

On the other hand, when the climate requires indoor air-conditioning, the air intake is shut and the ventilation fan is turned off to thermally insulate the indoor space from the outdoor air. Meanwhile, the heat exchange ventilator and the air distribution fan of each vertical duct connected to the ventilator are activated. Thereby, air in the underfloor ventilation layer and the ceiling ventilation layer is vented out with exchanging heat with outdoor air, and fresh air is drawn in through the heat exchange ventilator and delivered to the intermediate ventilation layer. In this manner, a certain amount of ventilation is realized with a minimum loss of thermal energy from the air in the air-conditioned indoor spaces.

Also in this invention, the two ventilation systems share the floor vents and the ceiling vents as the air circulation routes. The present invention likewise applies an integral ventilation structure of sharing a part of the two types of ventilation routes and selectively changing from one system to the other. The resulting system is rational and economical in terms of structure and facilities.

A modified constitution of the air cycle house of the present invention comprises, in addition to the above elements, a sensor for detecting an outdoor temperature and control means for automatically controlling drive and stop of the ventilation fan, the air distribution fan and the heat exchange ventilator as well as opening and closure of the air intake, based on a signal from the sensor. The control means is arranged to open the air intake, to drive the ventilation fan and to stop the air distribution fan and the heat exchange ventilator, when the outdoor temperature falls in a range which does not require air-conditioning in the indoor space. On the other hand, the control means is arranged to shut the air intake, to stop the ventilation fan and to drive the air distribution fan and the heat exchange ventilator, when the outdoor temperature is within a range which requires air-conditioning in the indoor space.

This invention is featured by the automatic change-over between the natural ventilation system and the heat-exchange ventilation system, with regard to the air cycle house of the above constitutions. The automatic ventilation replaces manual opening and closure of windows and constantly provides comfortable interior environment. Particularly, this constitution benefits aged persons who are not accustomed to mechanical control or those who are bothered to pay close attention to the change-over operation. Even in the absence of a dweller, this constitution constantly effects proper ventilation, thereby protecting the house from invasion of mold, ticks, dew condensation, etc. and extending the life of the house.

The sensor may be a common thermal sensor and installed on the outside of the house. Preferably, the sensor is located at a position free from direct influence of radiation heat or wind, for example, under the eaves or in a storage space (e.g. instrument screen) situated on the north side of the house. The control means may be electric control means using a microcomputer or the like.

In the context of the present invention, the outdoor temperature range which does not require indoor air-conditioning indicates a range of about 15° C. to about 26° C. In addition, the temperature range which requires indoor air-conditioning is below about 15° C. and above about 26° C. inclusive. Of course, such limits can be optionally adjusted to the climate or resident's preference.

A further modification of the air cycle house of the present invention comprises, in addition to the above elements, a wall ventilation layer defined between the exterior wall and the wall insulating layer to provide communication between the air intake and the underroof space.

This invention allows outdoor air to flow through the wall ventilation layer which locates externally of the wall insulating layer surrounding the indoor space. Since the air can pass through the wall ventilation layer upwardly into the underroof space, the inside of the wall is also protected from mold, ticks, dew condensation, etc. Particularly, in southern regions or where the solar radiation is intense in summer, a remarkable effect is observed in limiting the rise of indoor temperature caused by the sunlight. As a result, this structure keeps the indoor space cooler in summer and relieves the energy load for cooling.

The present invention also discloses a house ventilation system which comprises: an indoor space airtightly enclosed by a heat-insulating layer and thermally insulated from outdoor air; an air intake which can be opened and shut and which is formed through a portion of the heat-insulating layer to provide communication between a lower part of the indoor space and outdoor air; an air-discharge route which passes through another portion of the heat-insulating layer to provide communication between an upper part of the indoor space and outdoor air and to discharge air in the indoor space out of the house by means of a shuttered ventilation fan; a heat exchange ventilator which provides communication between the indoor space and outdoor air and which discharges air in the indoor space out of the house and takes in outdoor air, with allowing heat exchange between incoming air and outgoing air; an air-feed route joined to an intake part of the heat exchange ventilator to deliver the incoming air after the heat exchange to a certain area in the indoor space by means of an air distribution fan; an air-conditioner installed at a certain location in the indoor space; a sensor for detecting an outdoor temperature; and control means which automatically controls drive and stop of the ventilation fan, the air distribution fan, the heat exchange ventilator and the air-conditioner as well as opening and closure of the air intake, based on a signal from the sensor. The control means stores a temperature range as optionally set in advance and compares an outdoor temperature detected by the sensor with the temperature range. The control means is arranged to open the air intake, to drive the ventilation fan and to stop the air distribution fan, the heat exchange ventilator and the air-conditioner, when the outdoor temperature falls in the temperature range. On the other hand, the control means is arranged to shut the air intake, to stop the ventilation fan and to drive the air distribution fan, the heat exchange ventilator and the air-conditioner, when the outdoor temperature is outside the temperature range.

In addition, the control means comprises a preset temperature memory unit for storing a temperature range as optionally set in advance, a determination unit for comparing an outdoor temperature detected by the sensor with the temperature range, and a signal output unit for supplying an open/shut signal to the air intake and a drive/stop signal to each of the ventilation fan, the air distribution fan, the heat exchange ventilator and the air-conditioner, based on a determination of the determination unit.

The resulting house ventilation system can automatically adjust itself to a suitable ventilation system and operate air-conditioning based on the outdoor temperature, throughout a day and a year. As a result, safe and economical ventilation takes place, regardless of the presence of a resident. While extending the durability of the house and constantly providing a comfortable living environment, this arrangement benefits, in particular, to aged persons who are not accustomed to mechanical control or those who are bothered to pay close attention to the change-over operation.

The air-conditioner used in the present invention includes a common heat pump-type air-conditioning equipment using gas or electricity, an indirect air-conditioner using hot/cold water, etc., combined use of a heating apparatus (e.g. floor heating appliance) and a cooling apparatus, and any other known heating/cooling means operated by central control. The installation position of the air-conditioner is not particularly limited and can be appropriately decided in view of the characteristics of the equipment.

In the house ventilation system according to the present invention, the control means can be provided with a main power supply switch for turning on and off the control means. With the main power supply switch being off, the control means is automatically arranged to open the air intake, to drive the ventilation fan and to stop the air distribution fan, the heat exchange ventilator and the air-conditioner.

According to this invention, with the suspension of the control function, air-conditioning stops automatically and the ventilation routes of the natural ventilation system are established. Therefore, without the operation of control means, natural ventilation occurs automatically during a long absence or a season of mild climate, which further contributes to cut the energy expense for ventilation.

In this respect, the main power supply switch can be turned on and off by outdoor remote control, via a connection apparatus having a signal detection function and linked with a communication line. The connection apparatus, to which the on/off controller for the main power supply switch is connected, includes a telephone set linked with a digital telephone line, a personal computer connected to the Internet or other communication devices in connection with various communication networks. The minimum requirement of the connection apparatus involves a detection function of a signal sent from the outside and a control function of providing an on/off signal to the main power supply switch based on the received signal.

According to this invention, even when a person is away from home, the main power supply switch can be turned on and off by remote control by way of a communication line. For example, it is now possible to activate the air-conditioner before returning home or to change over the ventilation system in case of an unexpected rainfall or sudden weather change. This constitution further contributes to careful and appropriate ventilation.

In the present invention, the term "house" means a residence and other small- and medium-sized building, and generally indicates a building mainly used for the purpose of inhabitation, accommodation, work, rest, etc. of a person or persons.

DETAILED DESCRIPTION OF PREFERRED EMBODIMENTS

Referring to the attached drawings, the embodiments of the present invention are hereinafter described.

Figure 1:
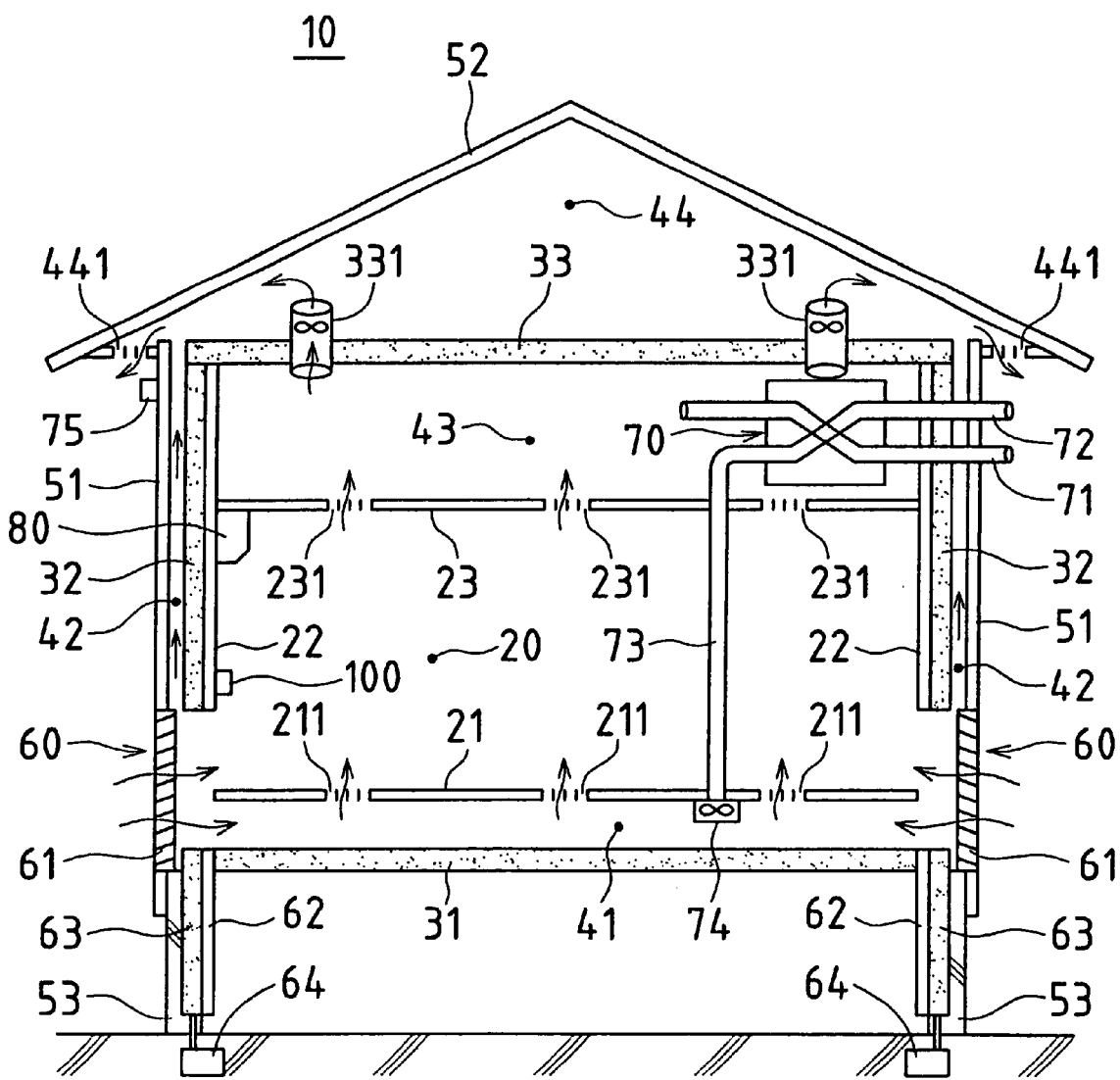
FIG. 1 shows a sectional structure of an air cycle house according to the first embodiment of the present invention, with indication of air circulation routes during the natural ventilation.
Figure 2:
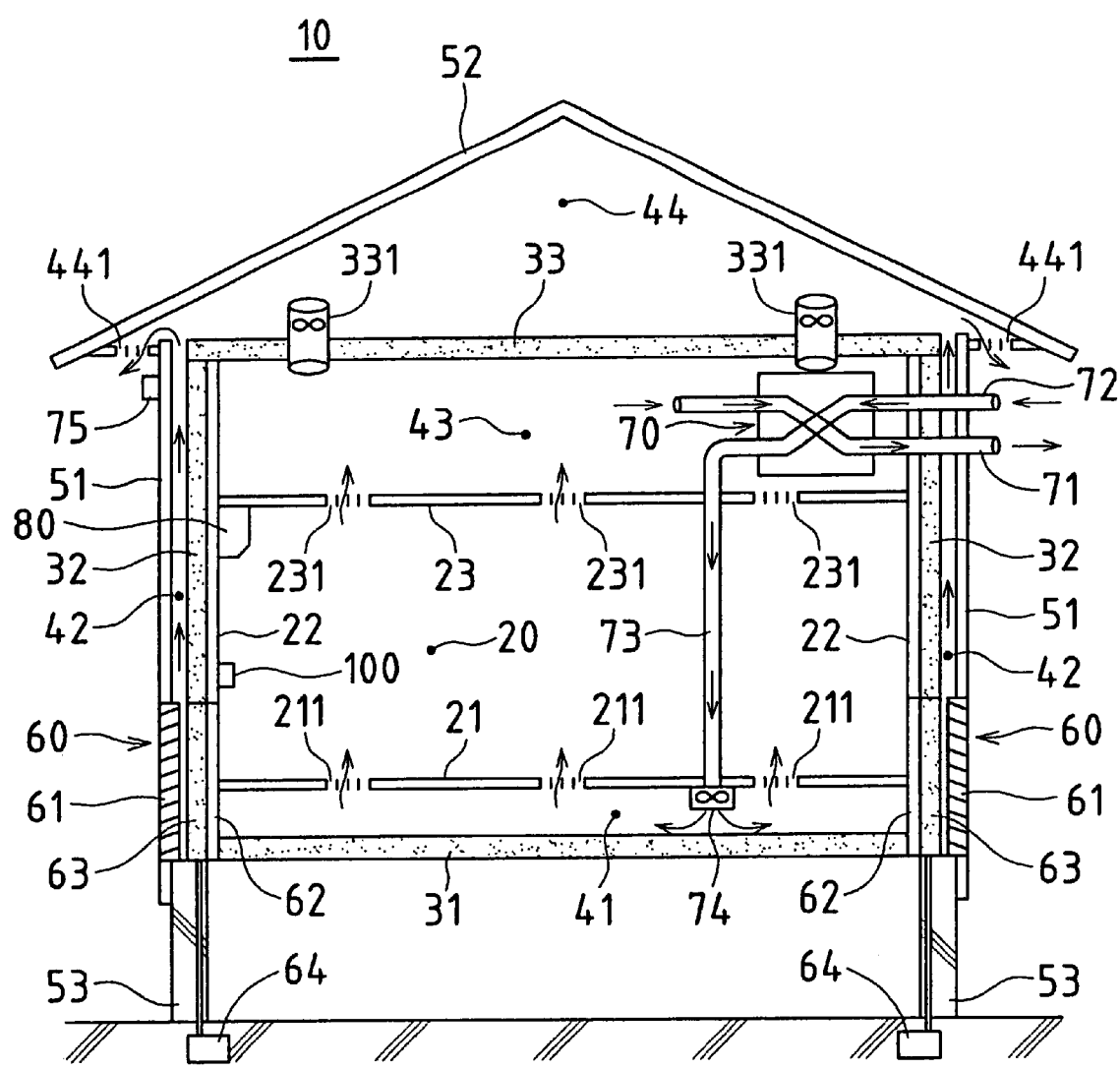
FIG. 2 shows a sectional structure of an air cycle house according to the first embodiment of the present invention, with indication of air circulation routes during the heat-exchange ventilation.

FIG. 1 and FIG. 2 show the sectional structure of an air cycle house 10 according to the first embodiment of the present invention. The air cycle house 10 is a one-story wooden architecture.

An indoor space 20, surrounded by a floor 21, an interior wall 22 and a ceiling 23, is highly insulated from outdoor air by an underfloor insulating layer 31, a wall insulating layer 32 and a ceiling insulating layer 33 disposed externally of each surrounding element.

The insulating material for the underfloor insulating layer 31 is located underneath a floor frame constructed by joints, sleepers and the like (not shown). The height of the joints, sleepers, etc. provides an underfloor ventilation layer 41 between the floor 21 and the underfloor insulating layer 31. The underfloor ventilation layer 41 is designed to establish communication substantially throughout the underfloor space in the air cycle house 10. A plurality of floor vents 211 are suitably formed in the floor 21, allowing communication between the underfloor ventilation layer 41 and the indoor space 20. This structure ensures communication of air throughout the house. Each floor vent 211 is constructed, for example, of a wooden/metal frame or grooved element fitted with a flat permeable material such as a grid or net. The floor vents 211 are positioned along corners of a room, closet or the like, so as not to obstruct a passage or be blocked by furniture.

The insulating material for the ceiling insulating layer 33 is disposed above ceiling beams, cradling receivers, etc. (not shown) which hang the ceiling 23. The height of the ceiling beams, cradling receivers, etc. defines a ceiling ventilation layer 43 between the ceiling 23 and the ceiling insulating layer 33. The ceiling ventilation layer 43 is designed to provide communication substantially throughout the space over the ceiling of the air cycle house 10.

A plurality of ceiling vents 231 are adequately formed in the ceiling 23 for communication between the indoor space 20 and the ceiling ventilation layer 43. The structure and installation of the ceiling vents 231 is roughly the same as that of the floor vents 211.

The insulating material for the wall insulating layer 32 is directly laid externally of the interior wall 22. The wall insulating layer 32 and an exterior wall 51 defines a wall ventilation layer 42 therebetween. Additionally, an underroof space or attic 44 is established between the ceiling insulating layer 33 and a roof 52.

An air intake 60 is formed through the lower part of the exterior wall 51, the wall insulating layer 32 and the interior wall 22. The air intake 60, which can be opened and shut, is equipped with louvers 61 built in the opening in,the exterior wall 51. The opening in the interior wall 22 which provides the air intake 60 incorporates a shielding panel 62 and an insulating panel 63 laid externally of the shielding panel 62. The shielding panel 62 and the insulating panel 63 are held by a guide frame (not shown) vertically extending through the floor 21. The shielding panel 62 and the insulating panel 63 can be raised and lowered by an elevator 64 disposed in the vicinity of a foundation 53. The vertical displacement opens and shuts the air intake 60. The pneumatically or hydraulically operated elevator 64 raises and lowers the shielding panel 62 and the insulating panel 63 by control means to be mentioned below. With the air intake 60 open (as shown in FIG. 1), fresh outdoor air is taken into the indoor space 20 and the underfloor ventilation layer 41. On the other hand, with the air intake 60 shut (as shown in FIG. 2), the indoor space 20 and the underfloor ventilation layer 41 are shielded off against outdoor air. While the air intake 60 is closed, however, the wall ventilation layer 42 remains to be communicated with outdoor air through the louvers 61 built in the exterior wall 51.

The ceiling insulating layer 33 includes shuttered ventilation fans 331 which project through the ceiling insulating layer 33. Driven by the control means to be mentioned below, the ventilation fans 331 discharge the air from the ceiling ventilation layer 43 into the underroof space 44. When the ventilation fans 331 are off, the shutters (now shown) are closed to block the communication between the ceiling ventilation layer 43 and the underroof space 44.

The underroof space 44 has underroof outlets 441 for discharging the air in the underroof space 44 out of the house. The underroof outlets 441 are situated under the eaves as illustrated, or, at the top of a gable wall or a ridge, etc. The ventilation fans 331 and the underroof outlets 441 form an air-discharge route for venting the indoor air out of the house. The ventilation from the underroof outlets 441 may be carried out under the forced ventilation or the natural ventilation.

The ceiling ventilation layer 43 accommodates a heat exchange ventilator 70. The heat exchange ventilator 70 has a discharge duct 71 and an intake duct 72 both projecting through the walls and opening to the outdoor. Heat is exchanged between the air vented out through the discharge duct 71 and the air drawn in through the intake duct 72. In this air cycle house 10, the indoor end of the discharge duct 71 opens in the ceiling ventilation layer 43, and the indoor end of the intake duct 72 is joined to a vertical duct 73 arranged perpendicularly through the indoor space 20. The heat exchange ventilator 70 may be a conventional sensible heat exchange ventilator, but in some region or under certain climate, a total enthalpy heat exchange ventilator can be utilized as well.

The vertical duct 73 is arranged in an invisible place in the indoor space 20, for example, within a partitioning wall (not shown) or in a corner of a closet. The bottom end of the vertical duct 73 communicates with the underfloor ventilation layer 41. An air distribution fan 74 is equipped at a suitable position on the vertical duct 73. When activated, the air distribution fan 74 forces the air to flow through vertical duct 73, with keeping a balance with the ventilation amount of the heat exchange ventilator 70. The vertical duct 73 and the air distribution fan 74 establish an air-feed route for introducing air into the house after heat exchange.

In the indoor space, an air conditioner 80 is installed at a proper position (in this embodiment, on the upper part of the interior wall 22).

On the outer surface of the exterior wall 51, a thermal sensor 75 for detecting the outdoor temperature is fixed near and under the eaves. The sensor 75 is electrically connected with a control system 100 with a built-in microcomputer secured on the interior wall 22. In response to a signal transmitted from the sensor 75, the control system 100 automatically controls the drive and stop of the ventilation fans 331, the air distribution fan 74, the heat exchange ventilator 70 and the air-conditioner 80, as well as the opening and closure of the air intake 60.

Figure 6:
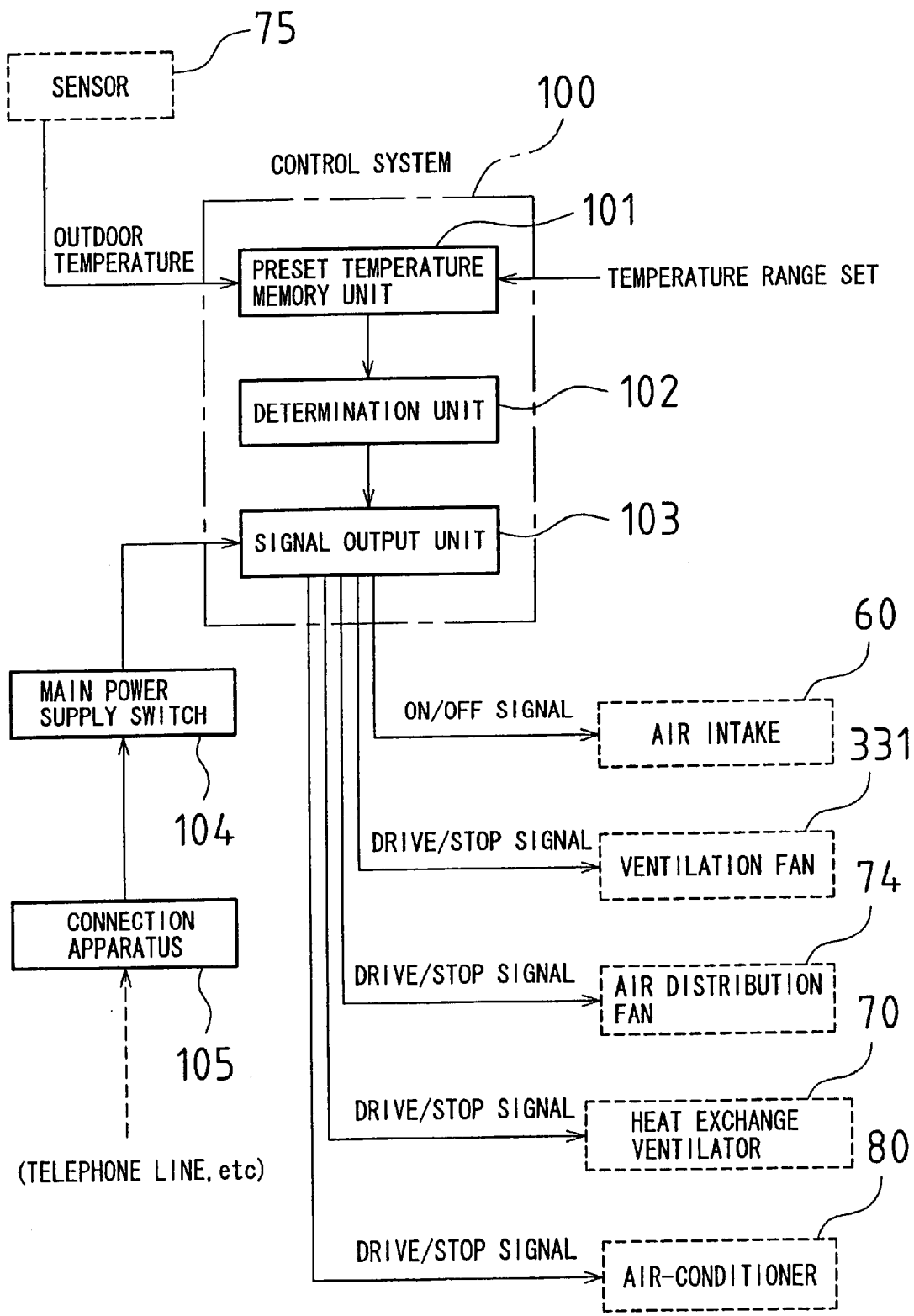
FIG. 6 is a functional block diagram of control means which constitutes the house ventilation system of the present invention.
Figure 7:
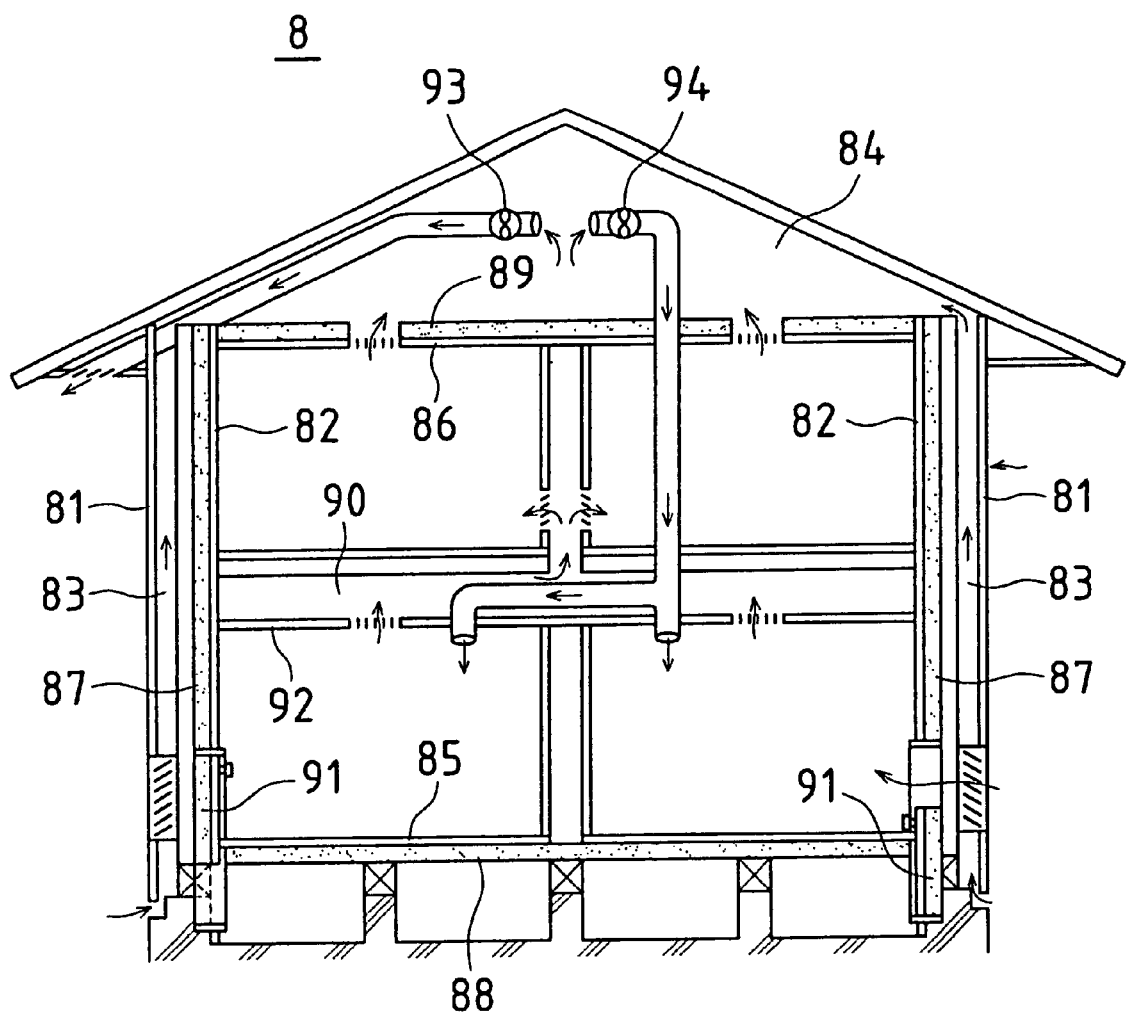
FIG. 7 shows a sectional structure of a prior art air cycle house based on the natural ventilation system, as disclosed by the inventor.

The control system 100 constitutes control means, which is the core of the house ventilation system according to the present invention. FIG. 6 is a functional block diagram of the control system 100.

The control system 100 comprises a preset temperature memory unit 101 which is arranged at an appropriate location in the house such as a living room or kitchen and which stores a temperature range as optionally set in advance, a determination unit 102 which compares the outdoor temperature detected by the sensor 75 with the temperature range stored in the preset temperature memory unit 101, and a signal output unit 103 which produces a signal to change the ventilation system based on the determination by the determination unit 102. The preset temperature memory unit 101 allows a resident to input optional temperatures for activating the heater (e.g. 15° C.) and the cooler (e.g. 26° C.) by operation of control keys, etc. The determination unit 102 checks whether the outdoor temperature falls between the two temperature limits (i.e. between 15° C. and 26° C.), and sends the result to the signal output unit 103.

When the outdoor temperature is within the preset temperature range, the signal output unit 103 supplies a signal to the elevator 64 to open the air intake 60. At the same time, it provides a drive signal to the ventilation fans 331 and stop signals to the air distribution fan 74, the heat exchange ventilator 70 and the air-conditioner 80. In contrast, when the outdoor temperature falls out of the preset temperature range (i.e. higher or lower than the preset temperature range), the signal output unit 103 supplies a signal to the elevator 64 to shut the air intake 60, and it simultaneously gives a stop signal to the ventilation fans 331 and drive signals to the air distribution fan 74, the heat exchange ventilator 70 and the air-conditioner 80.

The ventilation system of this structure is capable of automatically turning on or off the air-conditioner, and automatically selecting and switching over to either of the natural ventilation system and the heat-exchange ventilation system. These actions depend on the change of outdoor temperatures and occur irrespective of the presence or absence of a resident. Consequently, even when no one is at home, the indoor air can be ventilated safely and economically.

Besides, in this ventilation system, the control means can be switched on and off by a main power supply switch 104. When the main power supply switch 104 is turned off, namely, when the control function is suspended, the ventilation system is arranged to secure the ventilation routes under the natural ventilation system by automatically opening the air intake 60, driving the ventilation fans 331, and stopping the air distribution fan 74, the heat exchange ventilator 70 and the air-conditioner 80. Thereby, without any operation of the control means, natural ventilation takes place automatically during a long absence of a resident or a season of mild climate, etc., minimizing the expense for ventilation energy.

The main power supply switch 104 is further connected with a connection apparatus 105 which is linked with a digital telephone line. The connection apparatus 105 is a telephone or like apparatus with an equivalent signal detection function, which is arranged to turn on and off the main power supply switch 104 in accordance with predetermined signals inputted by an outdoor telephone operation (e.g. # followed by some digits of numbers). Such outdoor remote control leads to further attentive ventilation. For example, it is possible to activate an air conditioner before reaching home or to change the ventilation system in case of a sudden change of weather. In addition, the connection apparatus 105 may be a Web-connected personal computer, a CATV, or other communication devices connected to various communication networks, to which an on/off controller of the main power supply switch 104 is connected.

The control system 100 may also include an additional switch which permits compulsory manual change of the ventilation system or air-conditioner operation as required by a resident, regardless of the temperatures stored in the preset temperature memory unit 101.

FIG. 1 and FIG. 2 illustrate an example of the natural ventilation and the heat-exchange ventilation, respectively, with arrows indicating the air circulation routes.

During the natural ventilation, as shown in FIG. 1, the air intake 60 is open, and the ventilation fans 331 are driven. In the meantime, the heat exchange ventilator 70 and the air distribution fan 74 of the vertical duct 73 connected thereto are stopped, and the air-conditioner 80 is switched off. Under these conditions, fresh outdoor air is taken from the air intake 60 into the underfloor ventilation layer 41 and the indoor space 20. The air then rises from the indoor space 20 through the ceiling vents 231 up to the ceiling ventilation layer 43. The ventilation fans 331 further send the air into the underroof space 44, so that the air is discharged outdoors from the underroof outlets 441. The natural ventilation system based on upward natural convection achieves a sufficient amount of ventilation and efficiently prevents generation of mold, ticks, dew condensation inside the house. This ventilation system can save the energy expense, because it only requires an energy for driving the ventilation fans 331.

During the heat-exchange ventilation, as shown in FIG. 2, the air intake 60 is shut, and the ventilation fans 331 are stopped. Instead, the heat exchange ventilator 70 and the air distribution fan 74 of the vertical duct 73 connected thereto are driven, and the air-conditioner 80 is switched on. While the heat exchange ventilator 70 discharges the air in the ceiling ventilation layer 43 out of the house and introduces outdoor air, heat exchange takes place between the outgoing air and the incoming air. The incoming fresh air drawn through the heat exchange ventilator 70 passes through the intake duct 72 and the vertical duct 73 joined thereto, and reaches the underfloor ventilation layer 41. Then, the air in the underfloor ventilation layer 41 flows out from the floor vents 211 into the indoor space 20, where the air is heated or cooled. The air further flows up into the ceiling ventilation layer 43 through the ceiling vents 231. In this manner, a given amount of ventilation is ensured at a minimum thermal energy loss from the air heated or cooled in the indoor space 20.

Figure 3:
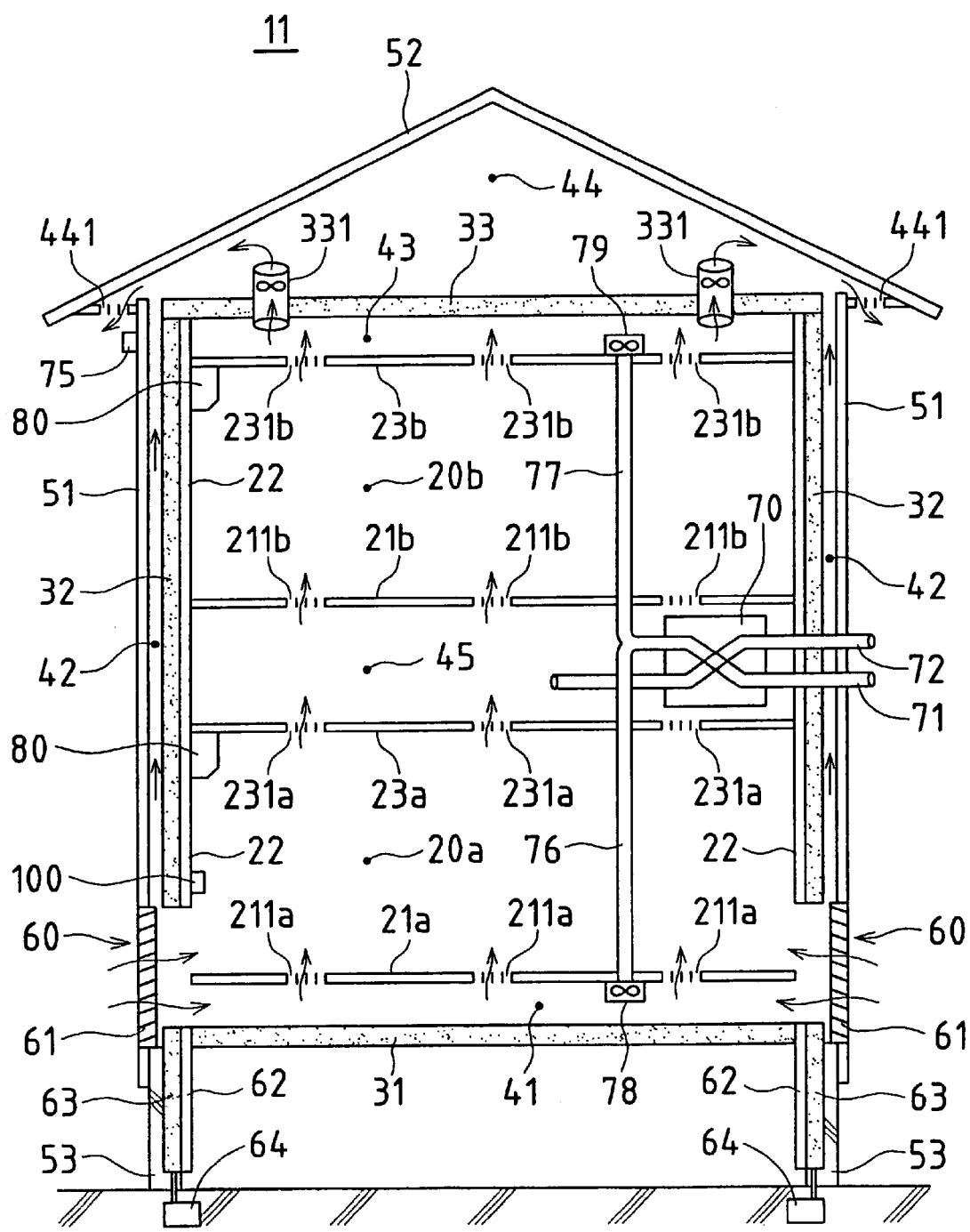
FIG. 3 shows a sectional structure of an air cycle house according to the second embodiment of the present invention, with indication of air circulation routes during the natural ventilation.
Figure 4:
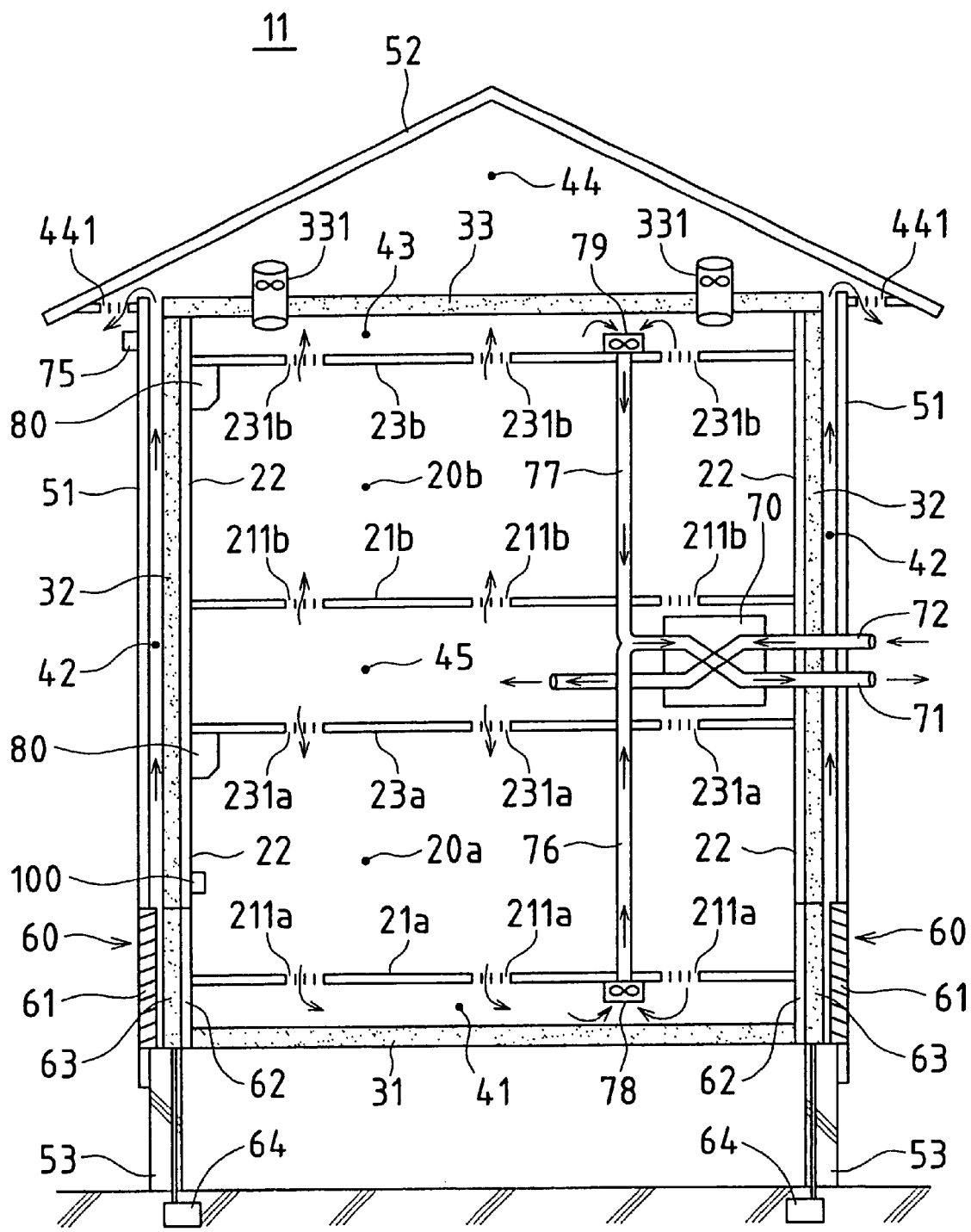
FIG. 4 shows a sectional structure of an air cycle house according to the second embodiment of the present invention, with indication of air circulation routes during the heat-exchange ventilation.

Next, FIG. 3 and FIG. 4 show sectional structures of an air cycle house 11 according to the second embodiment of the present invention. The two-story air cycle house 11 has a wooden principal structure.

The air cycle house 11 is of two-story structure, in which each story includes the indoor space 20 as mentioned in the air cycle house 10 of the first embodiment. Between the downstairs indoor space 20a and the upstairs indoor space 20b, there is defined an intermediate ventilation layer 45. The intermediate ventilation layer 45 accommodates the heat exchange ventilator 70, which is joined to a downstairs vertical duct 76 and an upstairs vertical duct 77. Apart from this modification, the air cycle house 11 has substantially the same structure as the air cycle house 10 according to the first embodiment.

Briefly, its entire construction is mentioned below. The upstairs and downstairs indoor spaces 20a, 20b and the intermediate ventilation layer 45 are externally surrounded and thermally insulated by an underfloor insulating layer 31, a wall insulating layer 32 and a ceiling insulating layer 33. An exterior wall 51 is disposed on the outer side of the wall insulating layer 32, with an interposition of a wall ventilation layer 42. An underroof space or attic 44 is formed between the ceiling insulating layer 33 and a roof 52. Likewise, the underfloor ventilation layer 41 is provided between a downstairs floor 21a and the underfloor insulating layer 31. The underfloor ventilation layer 41 and the downstairs indoor space 20a communicate with each other through downstairs floor vents 211a formed in the downstairs floor 21a. A downstairs ceiling 23a includes downstairs ceiling vents 231a which provide communication between the downstairs indoor space 20a and the intermediate ventilation layer 45, and an upstairs floor 21b has upstairs floor vents 211b for communication between the intermediate ventilation layer 45 and the upstairs indoor space 20b. A ceiling ventilation layer 43 is defined between an upstairs ceiling 23b and the ceiling insulating layer 33, and communicates with the upstairs indoor space 20b through upstairs ceiling vents 231b provided in the upstairs ceiling 23b. At the lower part of the downstairs indoor space 20a, an air intake 60 which can be opened or shut is formed through the exterior wall 51, the wall insulating layer 32 and the interior wall 22, establishing communication with the downstairs indoor space 20a and the underfloor ventilation layer 41. In the ceiling insulating layer 33, shuttered ventilation fans 331 are disposed in order to expel air from the ceiling ventilation layer 43 to the underroof space 44. The underroof space 44 has underroof outlets 441. In the upstairs and downstairs indoor spaces 20a, 20b, air-conditioners 80 are installed at the top of the interior walls 22 on both stories. A thermal sensor 75 for detecting the outdoor temperature is equipped near and under the eaves of the exterior wall 51. The sensor 75 is electrically connected to a control system 100 which is arranged to automatically control the drive and stop of the ventilation fans 331, the air distribution fans 78, 79 and the heat exchange ventilator 70, as well as the opening and closure of the air intake 60. For details on the form and structure of each element, reference can be made to the first embodiment.

The air cycle house 11 accommodates the heat exchange ventilator 70 in the intermediate ventilation layer 45, with the discharge duct 71 joined to the upstairs and downstairs vertical ducts 76, 77 which vertically extend through the upstairs and downstairs indoor spaces 20a, 20b. The downstairs vertical duct 76 opens into the underfloor ventilation layer 41, with an air distribution fan 78 equipped in the vicinity of its bottom end. Similarly, the upstairs vertical duct 77 opens into the ceiling ventilation layer 43, with an air distribution fan 79 equipped near its top end. The indoor end of the intake duct 72 of the heat exchange ventilator 70 is open within the intermediate ventilation layer 45. Inside the house, the air drawn up from the underfloor ventilation layer 41 through the downstairs vertical duct 76 and the air brought down from the ceiling ventilation layer 43 through the upstairs vertical duct 77 are vented outdoors through the discharge duct 71 of the heat exchange ventilator 70. On the other hand, outdoor air is taken into the house through the intake duct 72. Heat exchange occurs between the incoming air and the outgoing air, and, thereafter, the incoming air flows into the intermediate ventilation layer 45.

In the air cycle house 11, it is also possible to switch the ventilation system automatically between the natural ventilation and the heat-exchange ventilation, depending on weather conditions. FIG. 3 and FIG. 4 indicate, by arrows, air circulation routes under the natural ventilation and the heat-exchange ventilation, respectively.

During the natural ventilation, the air intake 60 is open as shown in FIG. 3. At the same time, the ventilation fans 331 are driven, and the heat exchange ventilator 70 is stopped together with the air distribution fans 78, 79 of the upstairs and downstairs vertical ducts 76, 77 connected with the ventilator 70. The air-conditioners 80 are switched off as well. From the air intake 60, fresh outdoor air enters the underfloor ventilation layer 41 and the downstairs indoor space 20a. Then, the air rises from the downstairs indoor space 20a, via the intermediate ventilation layer 45 and the upstairs indoor space 20b, to the ceiling ventilation layer 43. The air is further delivered to the underroof space 44 by the ventilation fans 331 and finally vented outdoors from the underroof outlets 441.

During the heat-exchange ventilation, the air intake 60 is shut as shown in FIG. 4. The ventilation fans 331 are off, while the heat exchange ventilator 70 is turned on together with the air distribution fans 78, 79 of the upstairs and downstairs vertical ducts 76, 77 connected with the ventilator 70. The air-conditioners 80 are also activated. In such circumstances, air is guided out of the underfloor ventilation layer 41 and the ceiling ventilation layer 43, delivered through the upstairs and downstairs vertical ducts 76, 77, and discharged outdoors by the heat exchange ventilator 70. Meanwhile, fresh outdoor air is taken in, causing heat exchange between the outgoing air and the incoming air. The fresh air is thus drawn through the heat exchange ventilator 70 into the intermediate ventilation layer 45. From the downstairs ceiling vents 231a and the upstairs floor vents 211b, the air flows into the downstairs indoor space 20a and the upstairs indoor space 20b, respectively. The air is either heated or cooled in the indoor spaces 20a, 20b. The air in the downstairs indoor space 20a enters the underfloor ventilation layer 41 from the downstairs floor vents 211a, and returns to the heat exchange ventilator 70 by way of the downstairs vertical duct 76. Likewise, the air in the upstairs indoor space 20b enters the ceiling ventilation layer 43 from the upstairs ceiling vents 231b, and returns to the heat exchange ventilator 70 via the upstairs vertical duct 77.

In the air cycle house 11, the downstairs air flow is reversed up and down during the natural ventilation and the heat-exchange ventilation. Nevertheless, both ventilation systems ensure smooth delivery and ventilation of air, because the heat exchange ventilator 70, the air distribution fans 78, 79 and the ventilation fans 331 operate to generate pressure differences in the ventilation layers.

Figure 5:
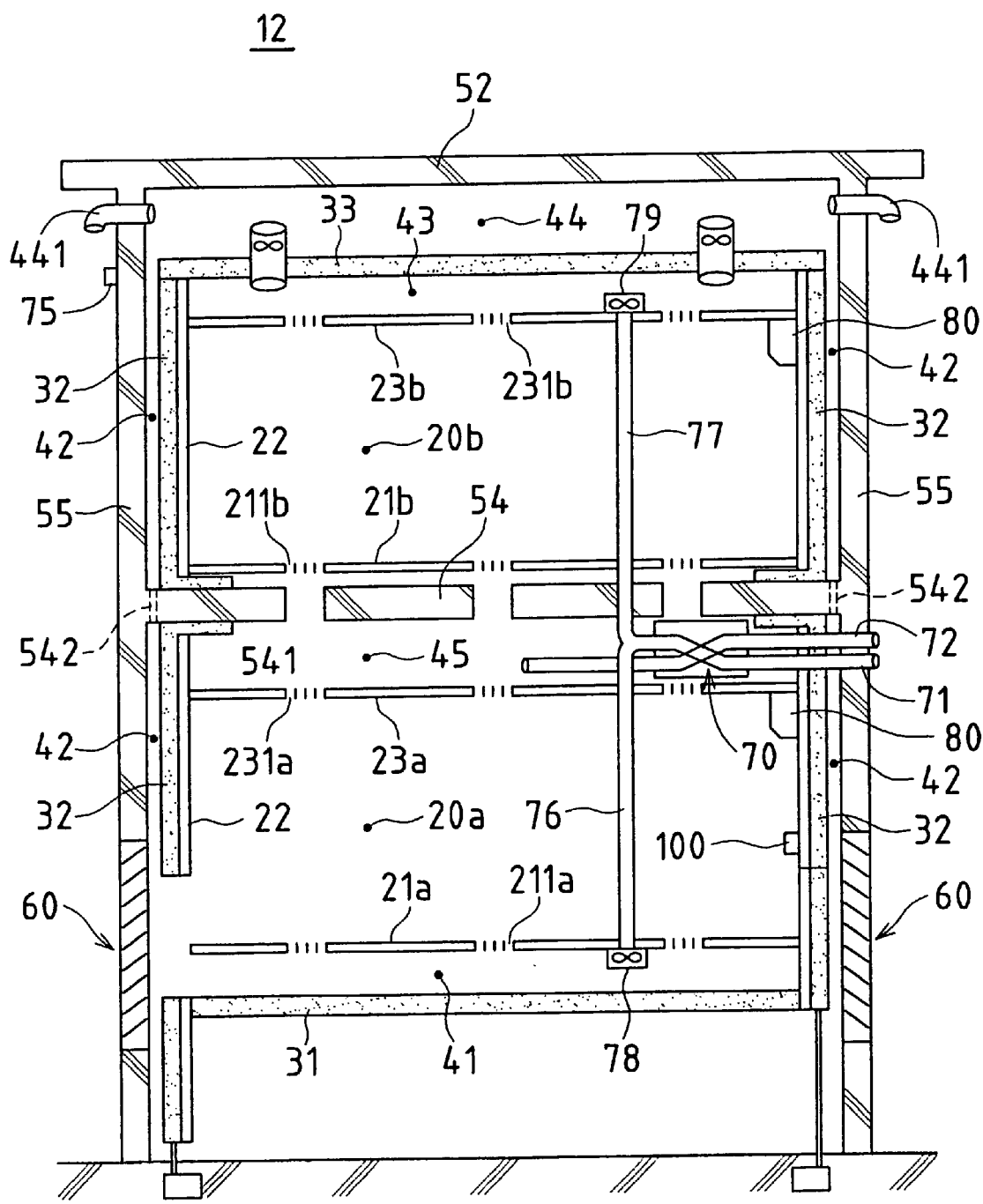
FIG. 5 shows a sectional structure of an air cycle house according to the third embodiment of the present invention, with indication of air circulation routes during the natural ventilation.

Next, FIG. 5 shows the sectional structure of an air cycle house 12 according to the third embodiment of the present invention. The two-story air cycle house 12 comprises a building frame made of reinforced concrete.

The air cycle house 12 is constructed basically in the same manner as the air cycle house 11 of the second embodiment, and employs similar air circulation routes for the natural ventilation and the heat-exchange ventilation. Therefore, the following description only relates to the differences regarding the building frame made of reinforced concrete and the connection portions of the heat-insulating layers and the ventilation layers.

In the air cycle house 12, the upstairs and the downstairs are sectioned off by a concrete slab 54 laid in the intermediate ventilation layer 45. The concrete slab 54 includes openings 541 for allowing vertical communication of air. Since the concrete slab 54 is integrated with a concrete wall 55 constituting the exterior wall, the concrete slab 54 is also formed with communication holes 542 in the vicinity of the joint with the concrete wall 55 so as to provide vertical communication through the wall ventilation layer 42. In this construction, heat stored in the concrete wall 55 can be transferred indoors via the concrete slab 54 which divides the wall insulating layer 32 into upper and lower parts. To prevent the heat transfer, an insulating material constituting the wall insulating layer 32 is extended as far as the periphery of the upper and lower surfaces of the concrete slab 54.

Owing to the above-mentioned strucutre, a house comprising a building frame of reinforced concrete can achieve both the natural ventilation and the heat-exchange ventilation, with enclosing the indoor spaces 20a, 20b in a thermally insulated state and establishing communication between the upstairs and the downstairs.

As described in the above embodiments, each air cycle house is arranged to share a part of the ventilation routes of the natural ventilation system and those of the heat-exchange ventilation system and to change over to either of the two ventilation routes as selected suitably for weather conditions. Namely, when the climate requires no air-conditioning, the natural ventilation system provides a sufficient amount of ventilation, effectively protecting the inside of the house from mold, ticks, dew condensation, etc., as well as advantageously saving the energy cost for ventilation. On the other hand, when the weather requires air-conditioning, the heat-exchange ventilation system achieves a given amount of ventilation, with a minimum loss of thermal energy from the air which is heated or cooled in the indoor space 20. Consequently, the house enhances year-round internal comfort, decreases energy consumption and also prolongs its life.

Further, the air cycle house of the present invention incorporates an integral ventilation structure which partly shares the ventilation routes of the different ventilation systems. This further cuts the installation cost for ventilation facilities, etc. at the time of construction.

In addition to a one-story architecture, the present invention is applicable to a two-story house, in which case mutual communication between the up-stairs and the downstairs also constitutes rational and economic ventilation routes. Further, the present invention can be applied to a house with three or more stories by multiplying the two-story ventilation structure as described in any of the above embodiments. In this case, a heat exchange ventilator is disposed in any of the intermediate ventilation layers and joined with vertical ducts which lead to each story.

In the present invention, each indoor space is adjacent to any two layers of the underfloor ventilation layer, the ceiling ventilation layer and the intermediate ventilation layer, with an interposition of its floor and ceiling. Therefore, in each story, the floor vents and the ceiling vents for letting air in and out of the indoor space can locate across the entire surface of the floor and the ceiling. This structure enables balanced air distribution over every part of the indoor space, ensuring a given amount of ventilation even in a small room having no contact with an exterior wall, inside a closet, boxroom, etc., inside a partitioning wall, or the like.

Preferably, in a house of two or more stories, the upstairs and downstairs vertical ducts are positioned in consideration of the type and layout of each story, so as to avoid extremely uneven distribution of air. Referring to FIG. 3 to FIG. 5, the upstairs and downstairs vertical ducts 76, 77 are in alignment. Alternatively, for example, the vertical ducts 76, 77 may be installed diagonally in a plan view of the indoor space.

The above embodiments utilize a plurality of floor vents 211, 211a, 211b, ceiling vents 231, 231a, 231b, ventilation fans 331, underroof outlets 441, respectively. However, the number of these elements should not be limited, and the invention may be accomplished with the use of one each of them.

The house ventilation system of the above embodiments automatically chooses a proper ventilation system and performs air-conditioning based on the outdoor temperature, throughout a day and a year. Due to this ventilation system, residents are no longer bothered by manual change-over operations. Besides, constant ventilation results in extension of the house life and reduction of the annual ventilation energy cost.

What is claimed is:

1. An air cycle house comprising:

an indoor space enclosed by a floor, an interior wall and a ceiling;

an underfloor insulating layer, a wall insulating layer and a ceiling insulating layer laid externally of the floor, the interior wall and the ceiling, respectively;

an exterior wall disposed externally of the wall insulating layer;

an underroof space locating above the ceiling insulating layer;

an underfloor ventilation layer defined between the floor and the underfloor insulating layer;

a ceiling ventilation layer defined between the ceiling and the ceiling insulating layer;

an air intake which can be opened and shut and which is formed through the exterior wall, the wall insulating layer and the interior wall to provide communication with the indoor space and the underfloor ventilation layer;

at least one floor vent which opens through the floor to provide communication between the underfloor ventilation layer and the indoor space;

at least one ceiling vent which opens through the ceiling to provide communication between the indoor space and the ceiling ventilation layer;

at least one shuttered ventilation fan projecting through the ceiling insulating layer to discharge air in the ceiling ventilation layer up to the underroof space;

at least one underroof outlet for discharging air in the underroof space out of the house;

a heat exchange ventilator installed in the ceiling ventilation layer and communicable with outdoor air, which ventilator discharges air in the ceiling ventilation layer out of the house and takes in outdoor air, with allowing heat exchange between incoming air and outgoing air; and a vertical duct equipped with an air distribution fan, joined to an intake part of the heat exchange ventilator and extending vertically through the indoor space, thereby to deliver the incoming air to the underfloor ventilation layer after the heat exchange.

2. An air cycle house comprising:

a downstairs indoor space enclosed by a downstairs floor, a downstairs interior wall and a downstairs ceiling;

an upstairs indoor space enclosed by an upstairs floor, an upstairs interior wall and an upstairs ceiling;

an underfloor insulating layer, a wall insulating layer and a ceiling insulating layer laid externally of the downstairs floor, the upstairs and downstairs interior walls and the upstairs ceiling, respectively;

an exterior wall disposed externally of the wall insulating layer;

an underroof space locating above the ceiling insulating layer;

an underfloor ventilation layer defined between the downstairs floor and the underfloor insulating layer;

an intermediate ventilation layer defined between the downstairs ceiling and the upstairs floor;

a ceiling ventilation layer defined between the upstairs ceiling and the ceiling insulating layer;

an air intake which can be opened and shut and which is formed through the downstairs exterior wall, the wall insulating layer and the downstairs interior wall to provide communication with the downstairs indoor space and the underfloor ventilation layer;

at least one downstairs floor vent which opens through the downstairs floor to provide communication between the underfloor ventilation layer and the downstairs indoor space;

at least one downstairs ceiling vent which opens through the downstairs ceiling to provide communication between the downstairs indoor space and the intermediate ventilation layer;

at least one upstairs floor vent which opens through the upstairs floor to provide communication between the intermediate ventilation layer and the upstairs indoor space;

at least one upstairs ceiling vent which opens through the upstairs ceiling to provide communication between the upstairs indoor space and the ceiling ventilation layer;

at least one shuttered ventilation fan projecting through the ceiling insulating layer to discharge air in the ceiling ventilation layer up to the underroof space;

at least one underroof outlet for discharging air in the underroof space out of the house;

a downstairs vertical duct equipped with an air distribution fan and extending vertically through the downstairs indoor space, thereby to deliver air in the underfloor ventilation layer toward the intermediate ventilation layer;

an upstairs vertical duct equipped with an air distribution fan and extending vertically through the upstairs indoor space, thereby to deliver air in the ceiling ventilation layer toward the intermediate ventilation layer; and a heat exchange ventilator installed in the intermediate ventilation layer and joined to the downstairs vertical duct and the upstairs vertical duct, which ventilator discharges, out of the house, air drawn from the underfloor ventilation layer via the downstairs vertical duct as well as air drawn from the ceiling ventilation layer via the upstairs vertical duct, and which also takes in outdoor air, with allowing heat exchange between incoming air and outgoing air and delivering the incoming air to the intermediate ventilation layer after the heat exchange.

3. An air cycle house according to claim 1 or 2, which further comprises a sensor for detecting an outdoor temperature and control means for automatically controlling drive and stop of the ventilation fan, the air distribution fan and the heat exchange ventilator as well as opening and closure of the air intake, based on a signal from the sensor, wherein the control means is arranged to open the air intake, to drive the ventilation fan and to stop the air distribution fan and the heat exchange ventilator when the outdoor temperature falls in a range which does not require air-conditioning in the indoor space, and the control means is arranged to shut the air intake, to stop the ventilation fan and to drive the air distribution fan and the heat exchange ventilator when the outdoor temperature is within a range which requires air-conditioning in the indoor space.

4. An air cycle house according to any of claim 1 or 2, which further comprises a wall ventilation layer defined between the exterior wall and the wall insulating layer to provide communication between the air intake and the underroof space.

5. A house ventilation system comprising:

an indoor space airtightly enclosed by a heat-insulating layer and thermally insulated from outdoor air;

an air intake which can be opened and shut and which is formed through a portion of the heat-insulating layer to provide communication between a lower part of the indoor space and outdoor air;

an air-discharge route which passes through another portion of the heat-insulating layer to provide communication between an upper part of the indoor space and outdoor air and to discharge air in the indoor space out of the house by means of a shuttered ventilation fan;

a heat exchange ventilator which provides communication between the indoor space and outdoor air and which discharges air in the indoor space out of the house and takes in outdoor air, with allowing heat exchange between incoming air and outgoing air;

an air-feed route joined to an intake part of the heat exchange ventilator to deliver the incoming air after the heat exchange to a certain area in the indoor space by means of an air distribution fan;

an air-conditioner installed at a certain location in the indoor space;

a sensor for detecting an outdoor temperature; and control means which automatically controls drive and stop of the ventilation fan, the air distribution fan, the heat exchange ventilator and the air-conditioner as well as opening and closure of the air intake, based on a signal from the sensor, wherein the control means stores a temperature range as optionally set in advance and compares an outdoor temperature detected by the sensor with the temperature range, and wherein the control means is arranged to open the air intake, to drive the ventilation fan and to stop the air distribution fan, the heat exchange ventilator and the air-conditioner when the outdoor temperature falls in the temperature range, and the control means is arranged to shut the air intake, to stop the ventilation fan and to drive the air distribution fan, the heat exchange ventilator and the air-conditioner when the outdoor temperature is outside the temperature range.

6. A house ventilation system according to claim 5, wherein the control means comprises a preset temperature memory unit for storing a temperature range as optionally set in advance, a determination unit for comparing an outdoor temperature detected by the sensor with the temperature range, and a signal output unit for supplying an open/shut signal to the air intake and a drive/stop signal to each of the ventilation fan, the air distribution fan, the heat exchange ventilator and the air-conditioner, based on a determination of the determination unit.

7. A house ventilation system according to claim 5 or 6, wherein the control means is provided with a main power supply switch for turning on and off the control means, and, with the main power supply switch being off, the control means is automatically arranged to open the air intake, to drive the ventilation fan and to stop the air distribution fan, the heat exchange ventilator and the air-conditioner.

8. A house ventilation system according to claim 7, wherein the main power supply switch can be turned on and off by outdoor remote control, via a connection apparatus having a signal detection function and linked with a communication line.

* * * * *

UNITED STATES PATENT AND TRADEMARK OFFICE
CERTIFICATE OF CORRECTION

PATENT NO. : 6,319,115 B1
DATED : November 20, 2001
INVENTOR(S) : Morinobu Shingaki Page 1 of 1

It is certified that error appears in the above-identified patent and that said Letters Patent is hereby corrected as shown below:

<u>Title page,</u>
The Assignee should read;
-- [73] Shinyo Co., Ltd., Okinawa (JP) --

Signed and Sealed this

Twenty-third Day of April, 2002

*Attest:*

JAMES E. ROGAN
*Attesting Officer*  *Director of the United States Patent and Trademark Office*